(12) United States Patent
Harris et al.

(10) Patent No.: US 6,842,115 B1
(45) Date of Patent: Jan. 11, 2005

(54) SYSTEM AND METHOD FOR SELF-CHECKOUT OF VIDEO MEDIA IN A RENTAL STORE

(75) Inventors: Timothy L. Harris, Stone Mountain, GA (US); Jason W. Taylor, Atlanta, GA (US); Charles Wike, Sugar Hill, GA (US)

(73) Assignee: NCR Corporation, Dayton, OH (US)

( * ) Notice: Subject to any disclaimer, the term of this patent is extended or adjusted under 35 U.S.C. 154(b) by 2 days.

(21) Appl. No.: 10/256,675

(22) Filed: Sep. 27, 2002

(51) Int. Cl.[7] ............................................. G08B 13/14
(52) U.S. Cl. ..................... 340/572.1; 235/381; 340/5.9; 705/16
(58) Field of Search ............................ 340/572.1, 5.9, 340/5.91, 5.92; 235/375, 380, 381, 385; 705/14, 16–18, 22–24, 28, 39, 41, 44, 64, 65, 67, 73, 75

(56) References Cited

U.S. PATENT DOCUMENTS

| | | | |
|---|---|---|---|
| 4,839,875 A | 6/1989 | Kuriyama | |
| 5,013,897 A | 5/1991 | Harman | |
| 5,133,441 A | 7/1992 | Brown | |
| 5,288,980 A | * 2/1994 | Patel et al. | ................. 235/381 |
| 5,777,884 A | 7/1998 | Belka | |
| 5,898,594 A | 4/1999 | Leason | |
| 5,963,134 A | 10/1999 | Bowers | |
| 6,169,483 B1 | 1/2001 | Ghaffari | |
| 6,195,006 B1 | 2/2001 | Bowers | |
| 6,300,872 B1 | 10/2001 | Mathias | |
| 2001/0016800 A1 | * 8/2001 | Koh et al. | ................. 702/188 |
| 2003/0106745 A1 | * 6/2003 | Taylor | .......................... 186/52 |

FOREIGN PATENT DOCUMENTS

JP 2000149135 A * 5/2000 ........... G07F/17/00

* cited by examiner

*Primary Examiner*—Thomas Mullen
(74) *Attorney, Agent, or Firm*—Maginot, Moore & Beck; Paul W. Martin (57) ABSTRACT

A system enables consumers to perform self-checkout and self-check-in of rental articles, especially rental video media. The system includes a scanner, a payment module, and an article transporter. The article transporter carries scanned articles having an attached, permanent EAS tag outside of an EAS tag interrogating zone. The self-checkout station of the present invention permits a consumer to identify his or her account and scan various video media for rental. The consumer may provide payment through the payment module and, once payment is accepted, the article transporter may be activated to carry the rented articles outside of an EAS tag interrogation zone adjacent to the self-checkout station.

20 Claims, 5 Drawing Sheets

SYSTEM AND METHOD FOR SELF-CHECKOUT OF VIDEO MEDIA IN A RENTAL STORE

FIELD OF THE INVENTION

This invention relates generally to video rental store operations and, more particularly, to the checkout of video media for rental.

BACKGROUND OF THE INVENTION

Self-checkout stations at grocery stores and other retail stores are well known. The stations permit a consumer to scan articles for purchase so the station may identify the articles and a corresponding price. When the consumer indicates all articles for purchase have been presented to the terminal, a sub-total is accumulated, any taxes and discounts are computed, and a total amount due is displayed for the consumer. The station then allows the consumer to select a payment method. The station presents menu selections to the consumer so funds may be transferred to the retailer's account. Upon confirmation of payment, the articles are released to the consumer.

A self-checkout station typically includes a terminal, a scanner and scales for reading unit price codes (UPC) and determining article weight, a cashier keypad and display, a POS terminal for payment entry, a receipt printer, a change unit, and a checkout area for holding articles once they have been scanned. The terminal also includes a display, a processor, memory, programmed instructions, and data peripherals to control the operations of the station. The programmed instructions may contain modules for querying for article prices, computing totals and performing other functions related to the purchase of articles through a self-checkout station. Some checkout stations may also include a security application program that uses data from sensors such as scales to reduce the likelihood that the consumer leaves without scanning all of the articles or exchanges scanned articles with more expensive articles that have not been scanned.

While self-checkout stations have been used in retail establishments where articles are sold to consumers, they have not been used for the checkout of rental articles. The absence of self-checkout stations in rental stores, especially video rental stores, is due to a variety of factors. For one, most video cassettes and digital video disks (DVDs) have permanent electronic article surveillance (EAS) tags attached to them. Permanent EAS tags are used because the time required for completely deactivating an EAS tag can be relatively long. The video rental business has periods of intense activity in which many people are trying to obtain videos for an evening or weekend. Consequently, the activity of deactivating EAS tags reduces the throughput of customers and may cause long lines and consumer frustration at the checkout counters. However, EAS tag interrogators are placed at the doors of video rental stores so consumers cannot enter the store with videos previously rented and return them to the shelves to avoid late charges. Of course, the interrogators also detect videos that consumers try to conceal for the purposes of taking them from the store without authorization. Thus, rental checkout attendants carry the videos that have been processed for rental through a path that avoids detection by the EAS tag interrogators and place them at a pickup area for a consumer. Self-checkout stations have been devised that facilitate EAS tag deactivation but none are known that process rental articles with permanent surveillance tags so articles with such tags may be removed without compromising store security.

Another issue that impedes the use of self-checkout stations in rental stores is the return of rented articles. Typically, they are placed in a designated area before one enters the EAS interrogation zone and processed for return at a time when the attendants are not busy with the checkout of other articles. When the returned articles are processed, attendants scanned a barcode on the article to update a database with an indication that the article has been returned and to determine whether the article has been untimely returned. In the event of untimely return, late charges are applied to the consumer's account. Also, as video rental stores have permitted articles to be checked out for multiple day periods, credits may be issued for the return of articles prior to expiration of the checkout period. Self-checkout stations used in stores where articles are purchased are not designed for the return of articles or for the issuance of credits or charges against a consumer's account in response to the return of articles.

What is needed is a way of providing self-checkout capability at a rental store without disabling detection of the unauthorized return of rented articles.

What is needed is a way of processing rental articles returned to the rental store for credit or late fees.

SUMMARY OF THE INVENTION

The above-noted limitations of using previously known self-checkout stations in rental stores have been overcome by a self-checkout station and method that operate in accordance with the principles of the present invention. The station comprises a scanner for reading a product identifier associated with the article to be rented and an account identifier for identifying a consumer's account, a payment module for accepting payment for rental of the scanned articles, and an article transporter for carrying a scanned article having an attached, permanent EAS tag outside of an EAS tag interrogation zone. The self-checkout station of the present invention permits a consumer to identify his or her account and scan various video media for rental. The consumer may provide payment through the payment module and, once payment is accepted, the article transporter may be activated to carry the rented articles outside of an EAS tag interrogation zone adjacent to the self-checkout station. Preferably, the transporter discharges the rented articles outside of the interrogation zone through which the consumer must pass to retrieve the rented articles. In this manner, the consumer is less likely to remove articles from the premises without authorization and the EAS tag remains activated for detection of the article should the consumer attempt re-entry through an EAS interrogation zone. Most preferably, the discharge area of the transporter is outside of all interrogation zones for the store to reduce the likelihood that a consumer is able to re-enter the display space of the store with rented articles.

Preferably, the self-checkout station of the present invention includes a return scanner for reading the product identifier associated with a rented article being returned and a return slot for receiving rented articles that have been scanned by the return scanner. The product identifier obtained by the return scanner may be used to identify the consumer's account charged with rental of the article and determine whether the article has been timely returned. A late fee or credit may then be assessed against the consumer's account. This aspect of the feature makes late fee charges and credits more quickly available so that they may be applied to a consumer's transaction conducted contemporaneously with the visit for the return of the rented articles.

To encourage scanning of returned articles, the return slot may be provided with a gate that blocks the return slot until it is released in response to a rented article scan signal generated by the return scanner. The gate is preferably a hinged door and a blocking member that prevents rotation of the door until released in response to a rented article scan signal. If the door is a metal door, the blocking member may be an electromagnet that is usually energized to hold the door closed at the return slot until a rented article scanned signal is received. In another embodiment, the blocking member may be a retractable bar that is movable with respect to a door edge by action of a solenoid. Of course, a sliding door or other known gate arrangement may be used in conjunction with the return scanner and return slot to encourage scanning of returned articles for consumer account reconciliation. The components for processing the return of rented articles may be incorporated in a self-checkout station for the renting of articles or, alternatively, they may be housed in a separate station.

The method of the present invention includes reading a product identifier associated with an article to be rented and an account identifier for identifying a consumer's account, accepting payment for rental of the scanned article, and transporting the scanned article having an attached, permanent EAS tag on a conveyor so the scanned article does not enter an EAS tag interrogation zone through which the consumer exits. The self-checkout method of the present invention allows a consumer to identify an account that authorizes the consumer to rent video media scanned for rental usage. Transporting the rented articles outside of the EAS interrogation zone adjacent to the self-checkout station reduces the risk of unauthorized removal of video media while maintaining the ability to detect articles with EAS tags should a consumer attempt re-entry through an EAS interrogation zone.

Preferably, the self-checkout method of the present invention includes reading a product identifier associated with an article having an attached, permanent EAS tag that is being returned and receiving the articles from which the product identifier has been read. The method also includes determining whether the article has been timely returned and updating a consumer's account that corresponds to the product identifier with a late fee or credit. The late fee or credit is assessed for return of an article at a time other than its due date. These elements of the method make late fee charges and credits available for any transaction that a consumer may conduct during a visit to return rented articles.

To encourage scanning of returned articles, the method also includes generating a scanned article signal in response to the product identifier reading and releasing a gate associate with a return slot in response to the scanned article signal. Receipt of the rented article includes enabling movement of a door covering the return slot so the return slot is selectively available for receiving returned articles. If the door is a metal door, the door may be enabled for receipt of rented articles by selectively deactivating an electromagnet that holds the door closed. In an alternative method, door movement is enabled by retracting a bolt to release a door edge.

It is an object of the present invention to provide self-checkout capability at a rental store without disabling detection of the unauthorized return of rented articles.

It is an object of the present invention to process the return of rental articles to a rental store for credit or late fees.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 1 is a perspective view of an exemplary self-checkout station for video media rental checkout and check-in;

DETAILED DESCRIPTION OF THE INVENTION

Figure 1:
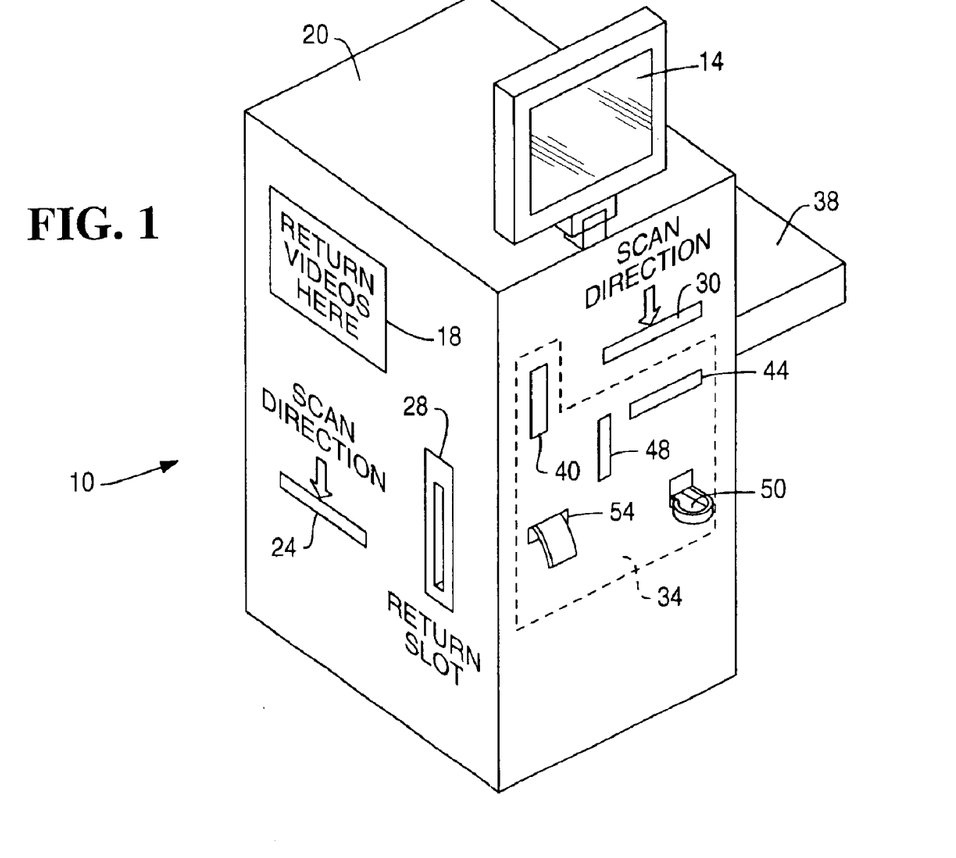

A checkout station that may be used for self-checkout and check-in of video media is shown in FIG. 1. Checkout station 10 may include a display screen 14 for displaying instructions to consumers checking out video media and display screen 18 for displaying instructions to consumers checking in video media. Although screen 14 is shown in a panel mounted to the top of housing 20 and screen 18 is depicted as being mounted within a cutout in housing 20, this arrangement is merely illustrative and other placements of instruction display indicia may be used. In general, checkout features of station 10 are mounted on one face of housing 20 while those components directed to the check-in of video media are mounted on a second face of housing 20. Orientation of the components for performing the two functions of station 10 on different faces of housing 20 is preferred so that the two functions may be spatially separated. This spatial separation allows consumers exercising the two functions of the stations to do so without interfering with one another. While the two functions are shown on adjacent faces for ease of illustration, the return media components may also be located on the face opposite the face having the checkout components to provide further spatial separation. The additional separation made possible by this arrangement also helps reduce the likelihood that the interrogation zone for detecting unauthorized re-entry of rented articles also covers the floor area in front of the checkout components. This helps reduce false triggering of the alarm devices activated by detection of EAS tags in an interrogation zone.

With further reference to FIG. 1, station 10 includes a return scanner 24 and a return slot 28. As discussed in more detail below, return slot 28 preferably includes a gate to block access to the return slot until a rented article is scanned at scanner 24. Return scanner 24 may be mounted in the vertical orientation as shown in FIG. 1 or a horizontal platform may extend from the side panel of housing 20 to incorporate a scanner for horizontal rather than vertical movement of the rented article. A computer with memory such as one having an Intel 486 or Pentium processor with a 20 MB hard drive and 64 MB of RAM may be mounted within housing 20 to operate the functions of station 1. One computer system may perform both functions of station 10 or a separate computer with memory may be incorporated in housing 20 for each function. Return scanner 24 reads a product identifier, such as a Uniform Product Code (UPC), on a label applied to a case that contains video tape or digital video disk (DVD). The computer controlling the check-in function may use the product identifier to query the store's database. The response to the query identifies the consumer account charged for rental of the article and the due date for return of the article. Any late fees or credits may then be determined and the computer may update the consumer's account maintained on the database to reflect the late charges or credits issued as a result of rented article check-in. This may be done on an article-by-article basis or the consumer may signal the end of article check-in by activating a touch screen area or other actuator designated for such a purpose so the computer generates all necessary queries and forms one update message from the responsive data.

Also as seen in FIG. 1, the checkout components include a checkout scanner 30, a payment module 34, and a rented article transporter 38. Checkout scanner 30 may be the same type as return scanner 24 and it performs the function of reading a product identifier for video media so the identifier may be used for database operations. Payment module 34 as shown in the figure accepts payment for a rental period from a consumer in the form of either cash or credit/debit card transaction. Rented article transporter 38 carries the scanned articles for which payment has been rendered along a path that remains outside of an EAS interrogation zone through which a consumer must pass to exit the store. Transporter 38 may be any known conveyor such as a motor-driven belt or segmented moving surface that may be used as a feeder belt for a checkout counter or a baggage carousel.

In more detail, payment module 34 includes a card reader 40, currency acceptor/discharge unit 44, coin slot 48, coin return 50, and receipt printer 54. Card reader 40 may be used by the computer controlling the checkout process to obtain consumer identification information from a card token that identifies the consumer and the consumer's rental or billing account. This data may include credit card information for billing or the consumer may be required to present the credit/debit card so the billing data may be read. Once the consumer is identified, the computer may direct the consumer to scan the articles that the consumer desires to rent. As checkout scanner 30 obtains the product identifier, the computer controlling the checkout process generates the database records for identifying the articles rented by the consumer and accumulates charges for the rental based on data retrieved from the database for the identified articles. When the consumer signals that all articles to be rented have been scanned, the computer determines the sub-total and applies late fees and credits that may have arisen from any check-in that the consumer performed along with outstanding credits or charges. The total is computed and displayed to the consumer. A query for the type of payment is displayed and the consumer identifies the form of payment to be presented. Currency and coins may be submitted through acceptor slot 44 and coin slot 48, respectively. Any change for the transaction may be provided through slot 44 and coin return 50. Alternatively, the consumer may present a credit/debit card, if required, through card reader 40 and the computer may perform the charge authorization against the consumer's credit or bank account in a known manner.

Figure 2A:
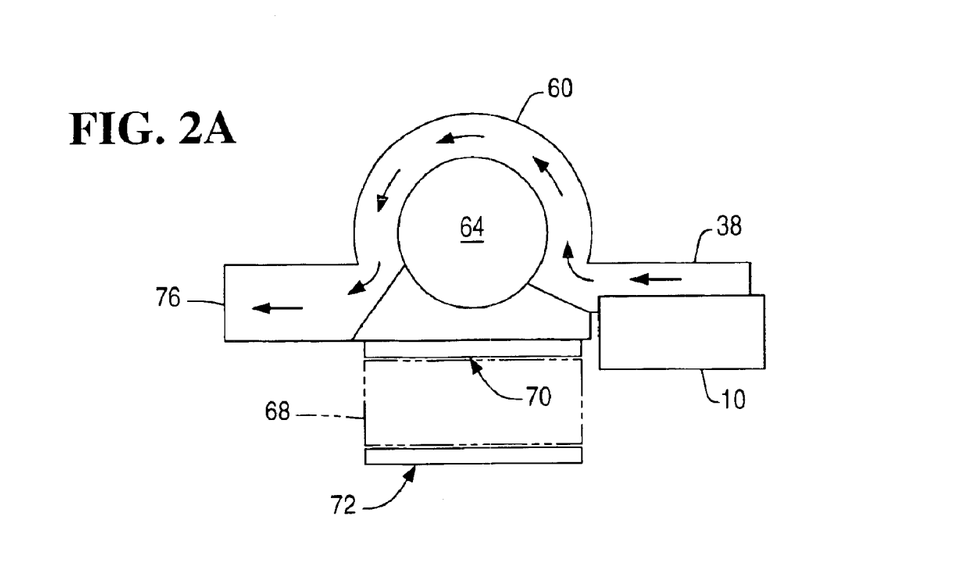
FIG. 2A is a top plan view of an exemplary self-checkout station for video media rental checkout.
Figure 2B:
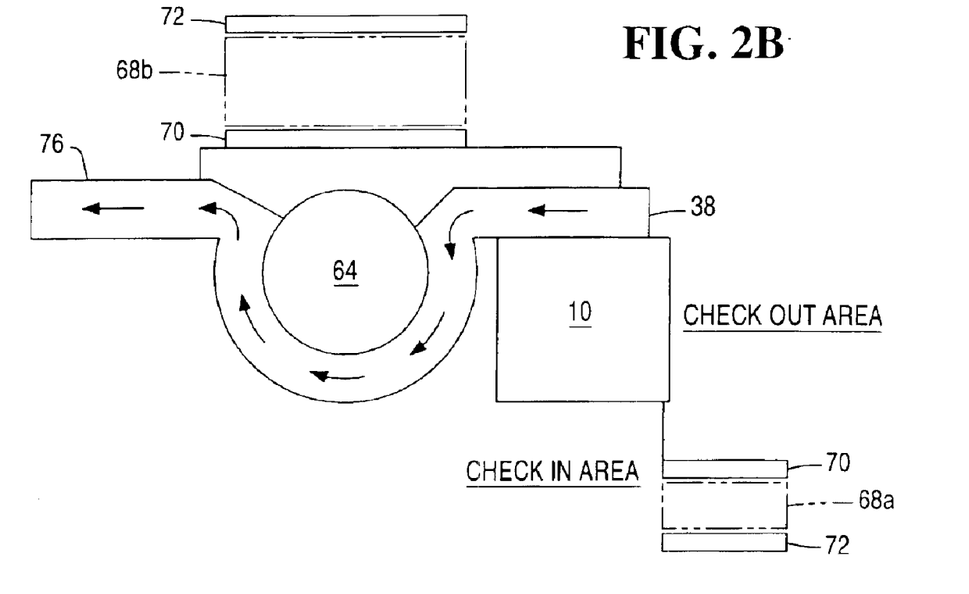
FIG. 2B is a top plan view of an exemplary self-checkout station that also incorporates the self-check-in function.

As shown in FIG. 2A, transporter 38 carries scanned articles along a path 60 (indicating by arrows) around a diverter 64 so the articles do not come within interrogation zone 68. Interrogation zone 68 is generated by EAS interrogators incorporated within panels 70 and 72. A consumer at station 10 exits the store by walking through interrogation zone 68 while the scanned articles travel along path 60 to discharge area 76. Preferably, discharge area 76 lies beyond the interrogation zones adjacent to all checkout stations for the store. Once a consumer picks up articles at discharge area 76, the consumer cannot re-enter the store without traveling through an interrogation zone. Station 10 in FIG. 2A does not incorporate a check-in function. Rather, the checkout function is implemented at the front face of housing 20 and incorporation of the check-in function in any of the remaining faces of housing 20 would impede the operation of transporter 38 or the exit route of a consumer. A station 10 that incorporates both checkout and check-in functions is shown in FIG. 2B. In that arrangement, a consumer checking in video media should check-in media in the check-in area before proceeding through interrogation zone 68a while those checking out media perform that function in the checkout area before exiting through interrogation zone 68b. Preferably, interrogation zone 68a is sufficiently offset from the checkout area that interrogation zone 68a does not cover the checkout area and generate false alarms by detecting EAS tags in this area authorized for tagged articles.

Figure 3A:
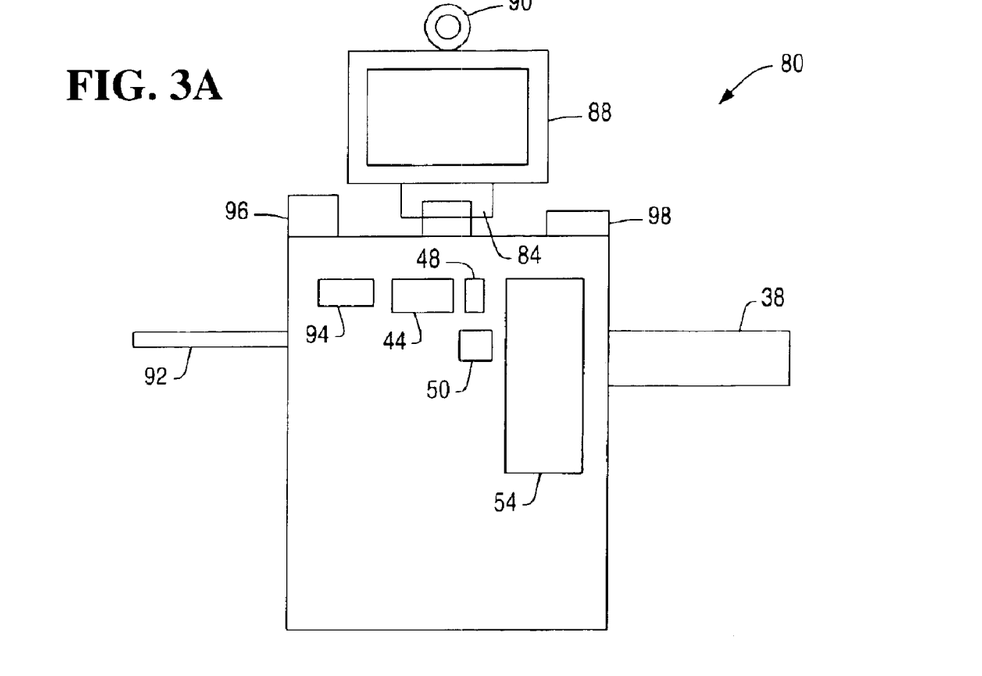
FIG. 3A is a front plan view of an exemplary self-checkout station for video media checkout only.

FIG. 3A depicts another version of a station that performs the checkout only function with some additional components. Station 80 has a scanner 84 that is located below display 88. Mounted to the top of display 88 is a security camera 90 for observing and/or recording images of transactions occurring at station 80. Using like numerals for like elements, station 80 also includes cash acceptor/dispenser 44, coin acceptor 48, coin return 50, receipt printer 54, and transporter 38. Additionally, a shelf 92 for holding articles to be scanned may be provided as well as a reader 94 for coupons that consumers may present for discounts on rentals. A check reader 96 may also be included to provide another payment option to consumers and the computer controlling the checkout function may use data read from the check to accept payment on the check. Also, a signature capture device 98 may be provided to obtain and/or verify signatures for credit card transactions and other checkout events.

Figure 3B:
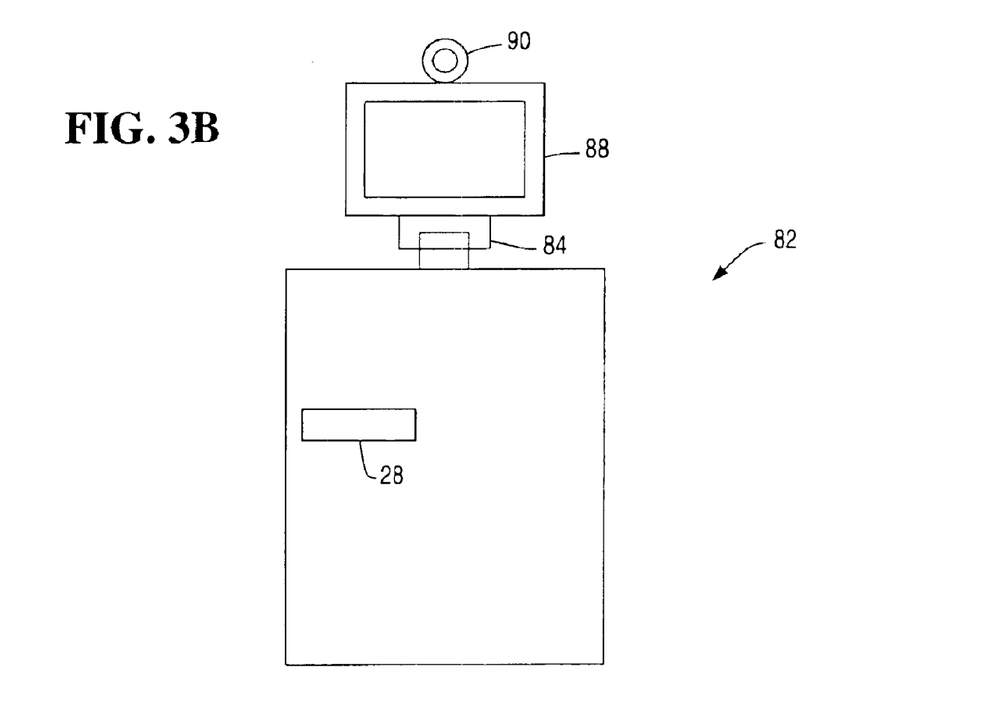
FIG. 3B is a front plan view of an exemplary self-check-in station for video media returns.

Again using like numerals for like components, a station 82 that performs the check-in function only is shown in FIG. 3B. Station 82 includes a display 88 with a scanner 84 and a security camera 90 mounted to it for the purpose of observing and/or recording activity at the check-in terminal. Return slot 28 allows rented articles to be placed within housing 20. Other embodiments of station 82 may include a payment module 34 should payment of late fees be required at check-in and/or a transporter 38 for carrying returned articles to an area for re-shelving.

Figure 4:
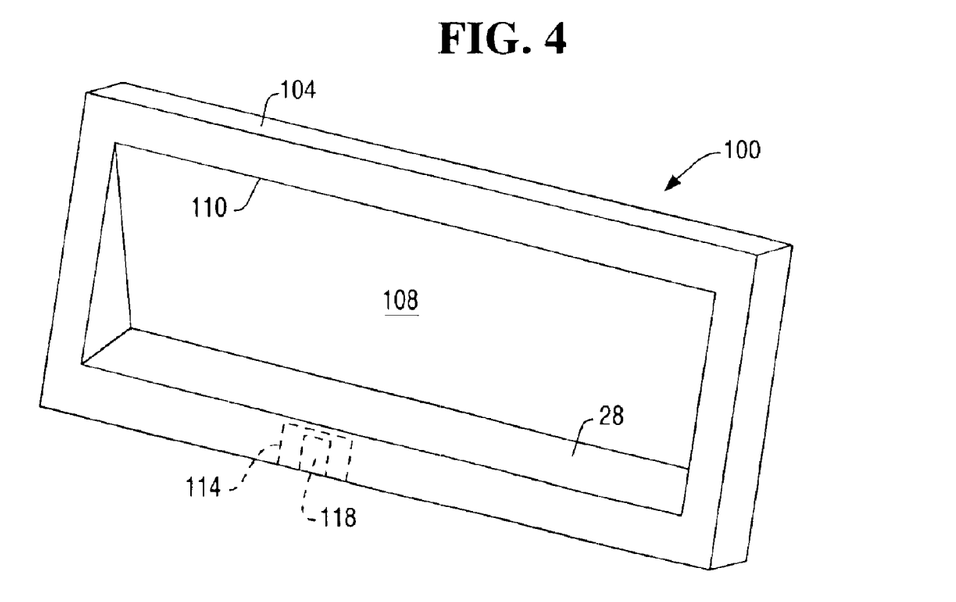
FIG. 4 is a perspective view of a return slot having a gate for controlling access to the return slot.

As shown in FIG. 4, return slot 28 may include a gate 100 for controlling access to return slot 28. Gate 100 may include a frame 104 about a door 108 that pivots about a hinge 110, although a sliding rather than a pivoting door may be used to control access to slot 28. An access control device 114 may be mounted proximate frame 104 to selectively block the movement of door 108 about its hinge 110. In FIG. 4, access control device 114 includes a blocking member 118 that may be a retractable pin or bolt coupled to a solenoid. In response to a scanned article signal that may be generated by a scanner, the solenoid may be energized to retract the otherwise extended pin or bolt 118 so door 108 may swing freely and permit an article to be placed within slot 28. In another embodiment, access control device 114 may be an electromagnet and door 108 made of metal so that the electromagnet may be selectively activated to hold door 108 in a closed position and deactivated to release the door in response to generation of the article scanned signal. Door 108 may be oriented so it swings open and returns to the closed position under the effects of gravity or a biasing member may be coupled to the door to urge the door closed.

Figure 5:
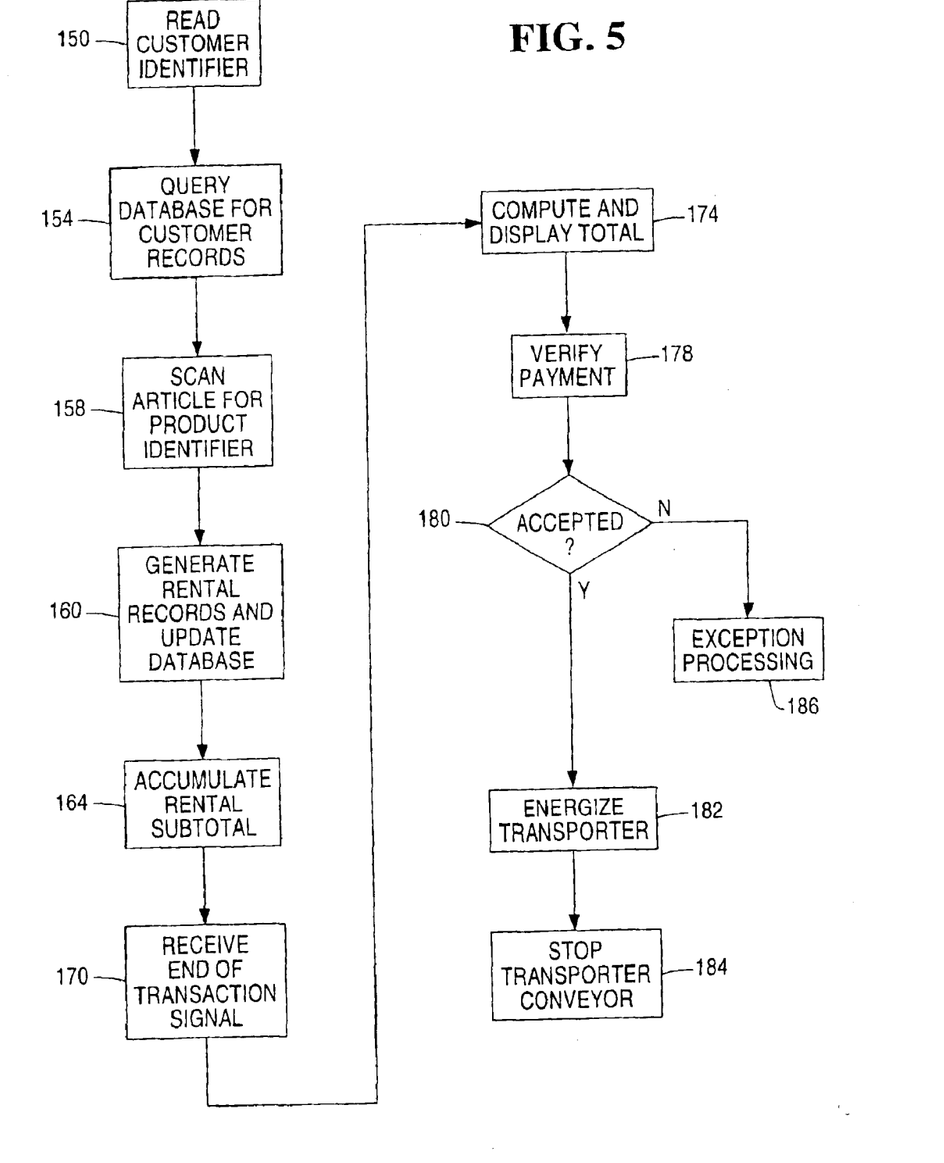
FIG. 5 is a flowchart of an exemplary method that may be used to provide self-checkout of rented video media.

An exemplary method for implementing the self-checkout of rental articles is shown in FIG. 5. The method includes reading a customer identifier (block 150) from a token or by entry of a customer identifier through a keypad or touch screen. The token may be read by the scanner or by the card reader. Also, if biometric data is used by a store for customer identification, biometric data may be obtained from a customer for identification purposes. The customer identifier is used to query the database for customer records (block 154). The customer also scans the articles being rented so the product identifier associated with the article may be read (block 158). The product identifiers are used to generate rental records (block 160) for the customer's account and to accumulate a sub-total (block 164). As articles are scanned, they are placed on the transporter. When the customer signals the end of the transaction (block 170), a total is computed and displayed (block 174). The customer tenders payment which is verified (block 178) and, upon acceptance (block 180), the transporter is energized (block 182). The transporter carries the scanned articles along a path outside of an EAS interrogation zone to a discharge area and the conveyor is stopped (block 184). If the payment is not verified then exception processing is performed to obtain another payment form or to clear the transaction and commence another one (block 186). The customer may then exit through the interrogation zone and pick up the articles at the discharge area. This method of checkout for rental articles reduces the risk of unauthorized removal of video media without requiring deactivation of the EAS tags attached to the articles.

Figure 6:
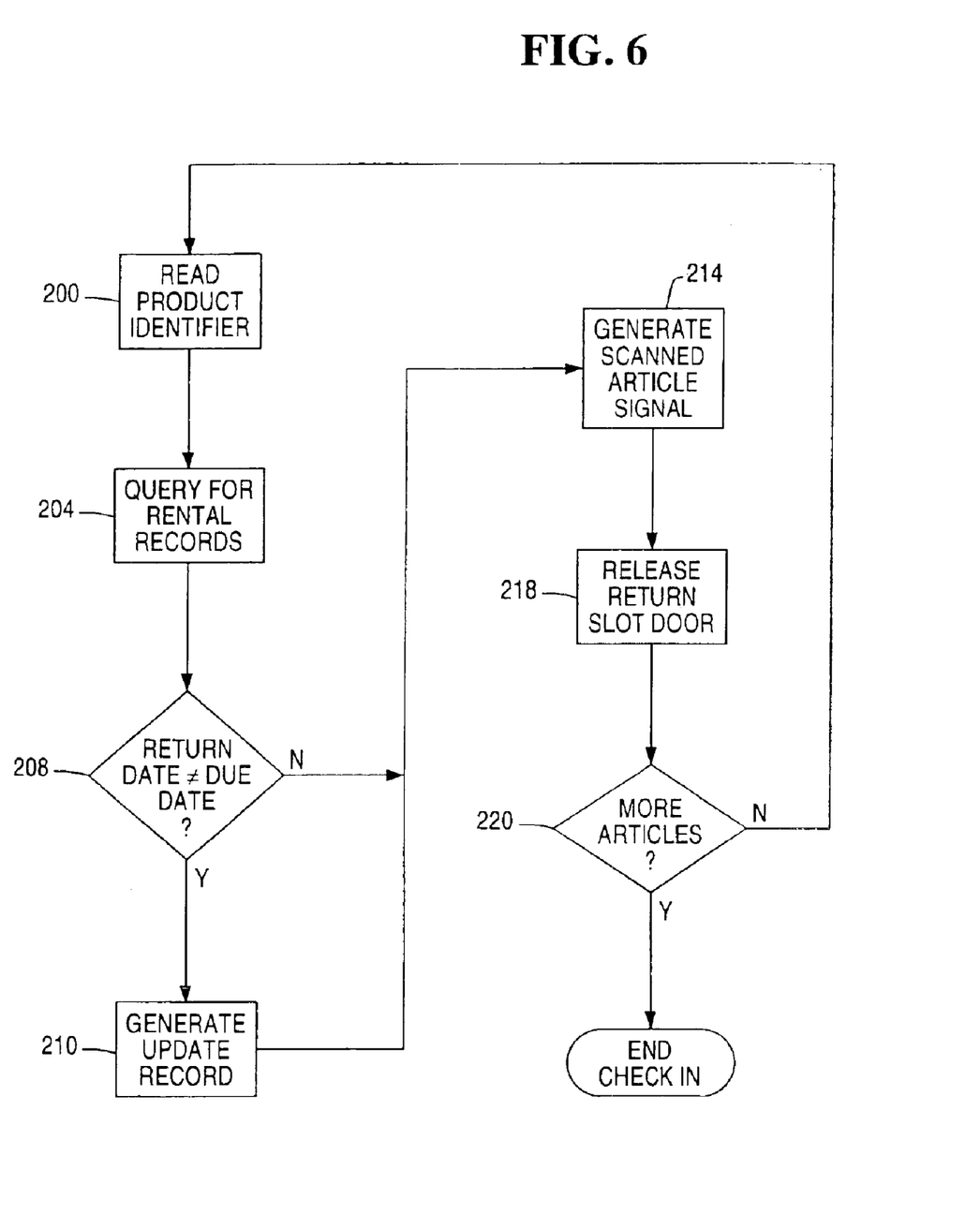
FIG. 6 is a flowchart of an exemplary method that may be used to provide self check-in of rented video media.

An exemplary self-check-in method of the present invention is shown in FIG. 6. The method includes reading a product identifier associated with a rented article (block 200). The product identifier is used to query a database to retrieve records and determine the account to which the rented article is charged (block 204). As the return date is compared to the due date (block 208), late fees and credits may be assessed and update records generated for the account (block 210). Upon verification that the scanned article is one that has been charged against a consumer's account with the store, a scanned article signal is generated (block 214) and used to release a door for a return slot (block 218). When all of the media have been returned (block 220), a customer may enter through the entrance interrogation zone for a store to browse and collect video media for rental.

In operation, a self-checkout station is modified to include a transporter for carrying articles having an EAS tag attached to it along a path that avoids an interrogation zone through which a customer exits. This self-checkout station permits the self-checkout station to be used for the rental of articles that have an attached, permanent EAS tag. A return station may also be provided, either separately from the checkout station or in an integrated manner, to accept the return of rental articles having permanent EAS tags. The return station also provides for a more timely posting of late fees and credits to a customer's account so they are available for the transactions conducted at the time of the customer's visit to return rental articles.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A self-checkout station for renting articles having permanent electronic article surveillance (EAS) tags comprising:

a scanner for reading a product identifier associated with an article to be rented and an account identifier for the identifying a consumer's account;

a payment module for accepting payment for rental of a scanned article; and a transporter for carrying the scanned article having an attached, permanent EAS tag so that the scanned article does not enter an interrogation zone through which a consumer exits.

2. The station of claim 1 wherein the transporter delivers the scanned article to a position outside of all interrogation zones for a store.

3. The station of claim 1, the transporter further comprising:

a diverter interposed between a path of the scanned article and the interrogation zone.

4. The station of claim 1 further comprising:

a return scanner for reading a product identifier associated with an article being returned with an active EAS tag; and a return slot for receiving rented articles that are being returned to a store.

5. The station of claim 4 further comprising:

a gate associated with the return slot, the gate being released so the return slot may receive a rented article in response to the return scanner generating a scanned article signal.

6. The station of claim 5, the gate further comprising:

a hinged door covering the return slot; and a blocking member for preventing rotation of the door so the return slot is selectively available for receiving returned articles.

7. The station of claim 6 wherein the blocking member is a retractable bolt.

8. The station of claim 6 wherein the blocking member is an electromagnet selectively activated to release the door.

9. A method for the self-checkout of rental articles having permanent electronic article surveillance (EAS) tags comprising:

reading a product identifier associated with an article to be rented and an account identifier for identifying a consumer's account;

accepting payment for rental of the scanned article; and transporting the scanned article having an attached, permanent EAS tag on a conveyor so the scanned article does not enter an EAS tag interrogation zone through which a consumer exits.

10. The method of claim 9 wherein the scanned article transportation includes delivering the scanned article to a position outside of all interrogation zones for a store.

11. The method of claim 10 further comprising:

reading a product identifier associated with an article having an attached permanent EAS tag that is being returned; and receiving the article from which the product identifier has been read.

12. The method of claim 11 further comprising:

generating a scanned article signal in response to the product identifier reading; and releasing a gate associated with a return slot in response to the generation of the scanned article signal so the return slot may receive the article.

13. The method of claim 12 further comprising:

enabling movement of a door covering the return slot so the return slot is selectively available for receiving returned articles.

14. The method of claim 13 wherein the movement enabling includes retracting a bolt.

15. The method of claim 13 wherein the movement enabling includes selectively activating an electromagnet.

16. The method of claim 13 further comprising:

determining whether the article from which the product identifier has been read was timely returned; and updating a consumer's account that corresponds to the product identifier with one of a late fee and credit in response to return of the article at a time other than its due date.

17. The method of claim 9, the scanned article transportation further comprising:

diverting the conveyor transporting the scanned article away from the interrogation zone.

18. A station for the return of rental articles comprising:

a return scanner for reading a product identifier associated with an article being returned with an active EAS tag; and a return slot for receiving rented articles that are being returned to a store.

19. The station of claim 18 further comprising:

a gate associated with the return slot, the gate being released so the return slot may receive a rented article in response to the return scanner generating a scanned article signal.

20. The station of claim 19, the gate further comprising:

a hinged door covering the return slot; and a blocking member for preventing rotation of the door so the return slot is selectively available for receiving returned articles.

* * * * *